United States Patent
Guillez et al.

(10) Patent No.: US 6,767,046 B1
(45) Date of Patent: Jul. 27, 2004

(54) MOTOR VEHICLE RETRACTABLE ROOF, COMPRISING AN ELEMENT ARTICULATED TO THE CHASSIS

(75) Inventors: Jean-Marc Guillez, Cirieres (FR); Gérard Queveau, Le Pin (FR)

(73) Assignee: France Design, Le Pin (FR)

( * ) Notice: Subject to any disclaimer, the term of this patent is extended or adjusted under 35 U.S.C. 154(b) by 0 days.

(21) Appl. No.: 10/416,324

(22) PCT Filed: Nov. 6, 2001

(86) PCT No.: PCT/FR01/03433

§ 371 (c)(1),
(2), (4) Date: May 6, 2003

(87) PCT Pub. No.: WO02/36375

PCT Pub. Date: May 10, 2002

(30) Foreign Application Priority Data

Nov. 6, 2000 (FR) .......................................... 00 14188

(51) Int. Cl.$^7$ ................................................. B60J 7/08
(52) U.S. Cl. .................................. 296/108; 296/107.19
(58) Field of Search ....................... 296/107.01, 107.08, 296/107.16, 107.17, 107.18, 107.19, 108

(56) References Cited

U.S. PATENT DOCUMENTS 6,092,335 A * 7/2000 Queveau et al. ....... 296/107.08
6,299,234 B1 * 10/2001 Seel et al. ................... 296/108
6,312,042 B1 * 11/2001 Halbweiss et al. .......... 296/108

* cited by examiner

Primary Examiner—Lori L. Coletta
(74) Attorney, Agent, or Firm—Nawrocki, Rooney & Sivertson, P.A.

(57) ABSTRACT

The invention concerns a motor vehicle retractable roof, comprising a front roof element (1), an intermediate roof element (2) and a rear roof element (3). The rear part of the rear element (3) is articulated at a fixed point (6) of the chassis, the front part of said rear element (3) being linked in articulation to the rear of the intermediate element (2), the intermediate element (2) is linked in articulation through an arm (9) articulated in a fixed point (10) of the chassis, the articulations (8, 10) of said arm (9) forming with the articulations (6, 7) of the rear element (3), a deformable quadrilateral. The invention is characterized in that the intermediate element (2) comprises a slide (11) extending between its front and rear edges and wherein is engaged a finger (12) borne by the rear of the front element (1) so that the latter can slide the intermediate element (2), said intermediate element (2) is connected to the front element (1) through a lever (13) articulated to said element (1) and near the front of the intermediate element (2), said lever (13) being itself linked in articulation to said arm (9) through a hinge link (16).

1 Claim, 1 Drawing Sheet

MOTOR VEHICLE RETRACTABLE ROOF, COMPRISING AN ELEMENT ARTICULATED TO THE CHASSIS

The present invention concerns a roof which can be retracted or withdrawn into the rear boot of a vehicle.

Such a retractable roof makes it possible in particular to convert a vehicle of the two-seater coupe or four-seater coupe or saloon type into a vehicle of the cabriolet type.

In the case of four-seater coupes or saloons, the roof has a relatively long length, so that the retractable roof is composed of three elements, each of which has a length compatible with the dimensions of the vehicle boot.

Thus a retractable roof for a vehicle is known, comprising a front roof element, an intermediate roof element and a rear roof element, these three elements being able to move between a position in which they cover the vehicle cabin and a position in which they are superimposed substantially horizontally in the rear boot of the vehicle.

The aim of the present invention is to afford improvements to the known means, in order to optimally control and guide the movement of the roof elements between their closure position and their position of storage in the boot.

According to the Invention, the retractable roof is characterised in that the rear part of the rear element is articulated at a fixed point on the chassis, the front part of this rear element being connected in an articulated fashion to the rear of the intermediate element, in that the intermediate element is connected in an articulated fashion by an arm articulated at a fixed point on the chassis, the articulations of this arm forming a deformable quadrilateral with the articulations of the rear element, in that the intermediate element comprises a slide extending between its front and rear edges and in which there is engaged a finger carded by the rear of the front element so that the latter can slide on the intermediate element, and in that this intermediate element is connected to the front element by a lever articulated on this element and close to the front of the intermediate element, this lever itself being connected in an articulated fashion to the said arm by a link.

Other particularities and advantages of the invention will also emerge from the following description.

In the accompanying drawings, given by way of non-limiting examples:

Figure 1:
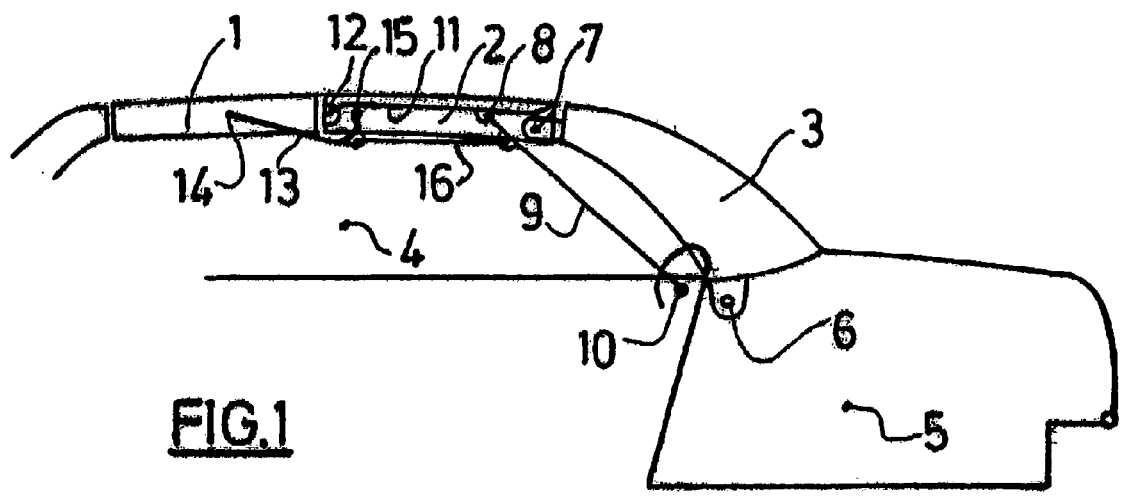
FIG. 1 is a schematic view in partial longitudinal section of a vehicle equipped with a retractable roof according to the invention, in the closed position.
Figure 2:
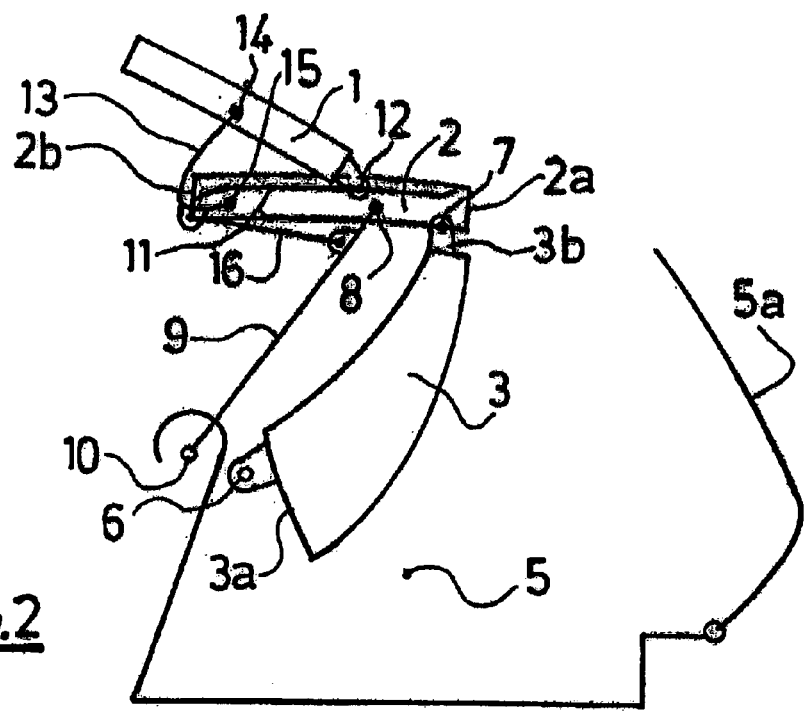
FIG. 2 is a view similar to FIG. 1, the retractable roof being in an intermediate position.
Figure 3:
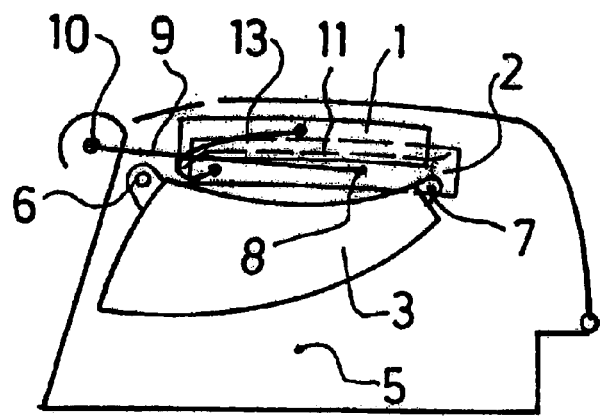
FIG. 3 is a view similar to FIGS. 1 and 2, the retractable roof being in the stored position in the vehicle boot.

In the embodiment depicted in FIGS. 1 to 3, the retractable roof comprises a front roof element 1, an intermediate roof element 2 and a rear roof element 3. These three elements 1, 2, 3 are able to move between a position in which (see FIG. 1) they cover the cabin 4 of the vehicle and a position in which (see FIG. 3) they are superimposed substantially horizontally in the rear boot 5 of the vehicle.

In accordance with the invention, the rear part 3a of the rear element 3 is articulated at a fixed point 6 on the chassis. The front part 3b of this rear element 3 is connected in an articulated fashion 7 on the rear 2a of the intermediate element 2.

The intermediate element 2 is connected in an articulated fashion 8 by an arm 9 articulated at a fixed point 10 on the chassis.

The articulations 8, 10 of these arms 9 form a deformable quadrilateral with the articulations 6, 7 of the rear element 3.

In addition, the intermediate element 2 comprises a slide 11 extending between its front 2b and rear 2a edges and in which there is engaged a finger 12 carried by the rear of the front element 1 so that the latter can slide on the intermediate element 2, as shown by FIG. 2.

Moreover, the intermediate element 2 is connected to the front element 1 by a lever 13 articulated at 14 on this element 1 and at 15 close to the front of the intermediate element 2. In addition, the lever 13 is connected in an articulated fashion to the arm 9 by a link 16.

The retractable roof which has just been described functions as explained below.

After unlocking of the elements 1, 2, 3 and opening of the lid 5a of the boot 5, the rearward tilting of the rear element 3 controlled by a motor or ram drives in its movement the intermediate element 2.

The rearward movement of the intermediate element causes the pivoting of the lever 9 towards the rear.

The pivoting of the lever 9 causes, by means of the link 16, the tilting of the lever 13 which causes the raising of the front element 1 and the engagement of the finger 12 on this element 1 in the slide 11 on the intermediate element 2.

The front element 1 is thus slidably superimposed on the element 2.

The movement continues thus until the three elements 1, 2, 3 are superimposed substantially horizontally in the boot 5, as indicated in FIG. 3.

What is claimed is:

1. A retractable roof for a vehicle, comprising a front roof element (1), an intermediate roof element (2) and a rear roof element (3), these three elements being able to move between a position in which they cover the vehicle cabin (4) and a position in which they are superimposed substantially horizontally in the rear boot (5) of the vehicle, characterised in that the rear part of the rear element (3) is articulated at a fixed point (6) on the chassis, the front part of this rear element (3) being connected in an articulated fashion to the rear of the intermediate element (2), in that the intermediate element (2) is connected in an articulated fashion by an arm (9) articulated at a fixed point (10) on the chassis, the articulations (8, 10) of this arm (9) forming a deformable quadrilateral with the articulations (6, 7) of the rear element (3), in that the intermediate element (2) comprises a slide (11) extending between its front and rear edges and in which there is engaged a finger (12) carried by the rear of the front element (1) so that the latter can slide on the intermediate element (2), and in that this intermediate element (2) is connected to the front roof element (1) by a lever (13) articulated on this element (1) and close to the front of the intermediate element (2), this lever (13) itself being connected in an articulated fashion to the arm (9) by a link (16).

* * * * *